United States Patent
Fujita

(10) Patent No.: US 12,311,920 B2
(45) Date of Patent: May 27, 2025

(54) PARKING ASSISTANCE DEVICE, PARKING ASSISTANCE METHOD, AND COMPUTER PROGRAM PRODUCT

(71) Applicant: DENSO CORPORATION, Kariya (JP)

(72) Inventor: Taishi Fujita, Kariya (JP)

(73) Assignee: DENSO CORPORATION, Kariya (JP)

( * ) Notice: Subject to any disclaimer, the term of this patent is extended or adjusted under 35 U.S.C. 154(b) by 287 days.

(21) Appl. No.: 18/050,893

(22) Filed: Oct. 28, 2022

(65) Prior Publication Data

US 2023/0091505 A1     Mar. 23, 2023

Related U.S. Application Data

(63) Continuation of application No. PCT/JP2021/007922, filed on Mar. 2, 2021.

(30) Foreign Application Priority Data

May 1, 2020   (JP) ................................ 2020-081439

(51) Int. Cl.
*B60W 30/06*     (2006.01)
*B60W 40/04*     (2006.01)

(52) U.S. Cl.
CPC ............ *B60W 30/06* (2013.01); *B60W 40/04* (2013.01); *B60W 2552/53* (2020.02); *B60W 2554/20* (2020.02)

(58) Field of Classification Search
None
See application file for complete search history.

(56) References Cited

U.S. PATENT DOCUMENTS

| | | | |
|---|---|---|---|
| 11,465,616 B2 * | 10/2022 | Hause | B60W 30/18036 |
| 2017/0355307 A1 * | 12/2017 | Ha | G06V 20/586 |
| 2021/0179078 A1 * | 6/2021 | Nakada | G08G 1/168 |
| 2021/0188253 A1 * | 6/2021 | Burtch | B62D 15/0285 |
| 2021/0245735 A1 * | 8/2021 | Wang | G08G 1/143 |
| 2021/0354688 A1 | 11/2021 | Tashiro et al. | |
| 2021/0370912 A1 * | 12/2021 | Yamamoto | H04N 7/18 |
| 2022/0172623 A1 * | 6/2022 | Hidaka | G08G 1/146 |
| 2022/0348190 A1 * | 11/2022 | Hüger | G01S 15/86 |

FOREIGN PATENT DOCUMENTS

| | | | | |
|---|---|---|---|---|
| JP | 2018-83481 A | | 5/2018 | |
| KR | 20200019725 A | * | 2/2020 | B60R 21/00 |
| WO | WO-2019093176 A1 | * | 5/2019 | B60D 1/00 |

* cited by examiner

*Primary Examiner* — Amelia Vorce
(74) *Attorney, Agent, or Firm* — Maschoff Brennan

(57) ABSTRACT

A parking assistance device includes a blind spot area calculation unit, a parking position determination unit, and a parking assistance unit. The blind spot area calculation unit is configured to calculate a size of a blind spot area of a subject vehicle created when the subject vehicle is parked at a specific position in a parking space scheduled for the subject vehicle. The parking position determination unit is configured to determine, as a parking position, the specific position where a predetermined condition related to the size of the blind spot area is satisfied. The parking assistance unit is configured to assist parking of the subject vehicle at the determined parking position.

13 Claims, 13 Drawing Sheets

PARKING ASSISTANCE DEVICE, PARKING ASSISTANCE METHOD, AND COMPUTER PROGRAM PRODUCT

CROSS REFERENCE TO RELATED APPLICATION

The present application is a continuation application of International Patent Application No. PCT/JP2021/007922 filed on Mar. 2, 2021, which designated the U.S. and claims the benefit of priority from Japanese Patent Application No. 2020-081439 filed on May 1, 2020. The entire disclosures of all of the above applications are incorporated herein by reference.

TECHNICAL FIELD

The present disclosure relates to a technique for assisting parking of a vehicle.

BACKGROUND

A device configured to assist the departure of the subject vehicle from a parking section is known. The parking assistance device is configured to store the surroundings environment information when the subject vehicle moves into a parking space. The parking assistance device is configured to complement, in a case where a blind spot area exists around the subject vehicle when the subject vehicle goes out of the parking space, the information about the blind spot area for surroundings environment information stored when the subject vehicle entered the parking space.

SUMMARY

A first aspect of the present disclosure is a parking assistance device including: a blind spot area calculation unit configured to calculate a size of a blind spot area of a subject vehicle created when the subject vehicle is parked at a specific position in a parking space scheduled for the subject vehicle; a parking position determination unit configured to determine, as a parking position, the specific position where a predetermined condition related to the size of the blind spot area is satisfied; and a parking assistance unit configured to assist parking of the subject vehicle at the determined parking position.

A second aspect of the present disclosure is a method for a processor to assist parking of a subject vehicle. The method including: calculating a size of a blind spot area of the subject vehicle created when the subject vehicle is parked at a specific position in a parking space scheduled for the subject vehicle; determining, as a parking position, the specific position where a predetermined condition related to the size of the blind spot area is satisfied; and assisting parking of the subject vehicle at the determined parking position.

A third aspect of the present disclosure is a computer program product stored on at least one non-transitory computer readable medium and comprising instructions configured to, when executed by at least one processor, cause the at least one processor to: calculate a size of a blind spot area of the subject vehicle created when the subject vehicle is parked at a specific position in a parking space scheduled for the subject vehicle; determine, as a parking position, the specific position where a predetermined condition related to the size of the blind spot area is satisfied; and assist parking of the subject vehicle at the determined parking position.

EMBODIMENTS

Comparative Example

Figure 1:
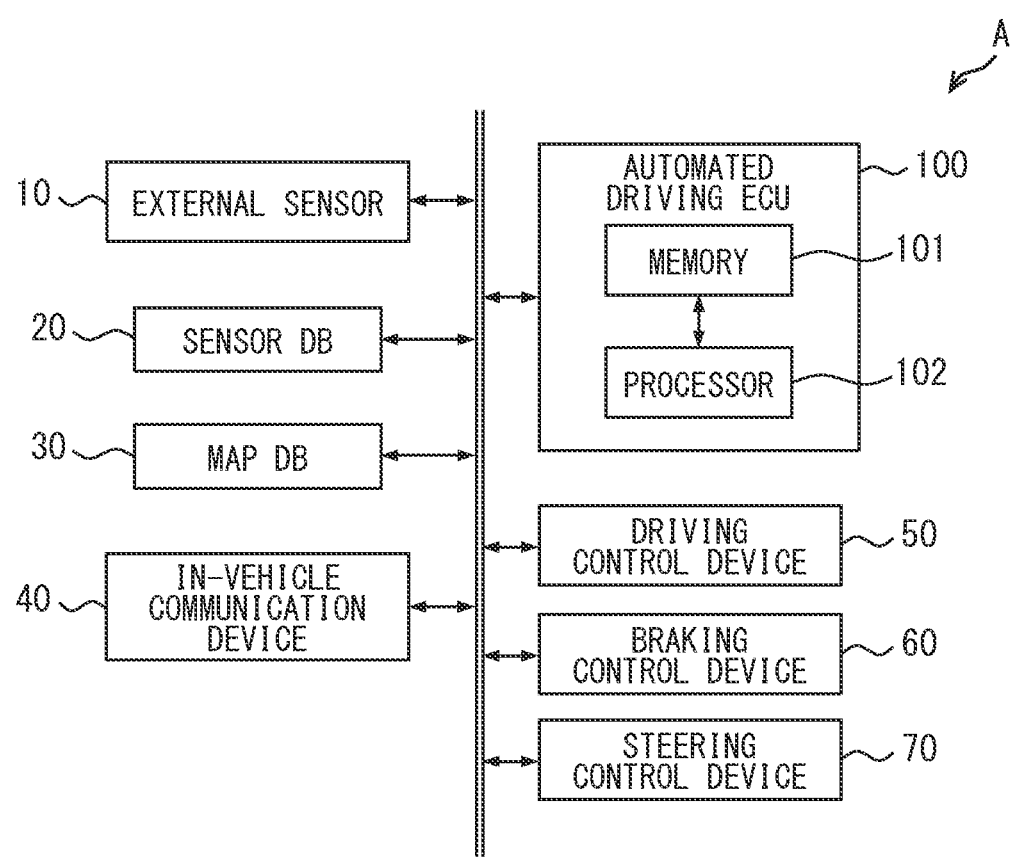
FIG. 1 is a diagram illustrating a system including a parking assistance device.
Figure 2:
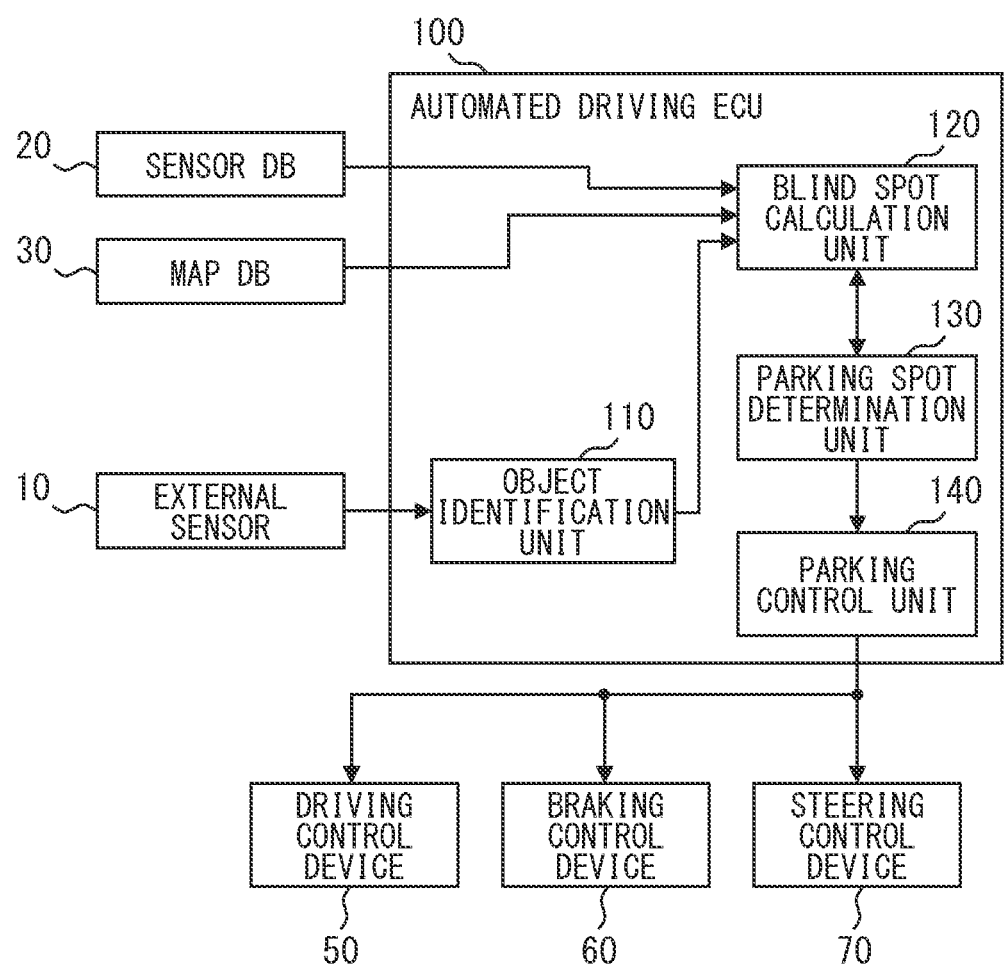
FIG. 2 is a block diagram illustrating an example of functions of the parking assistance device.

A parking assistance device of a comparative example is configured to complement the information about the blind spot area for the surroundings environment information stored when the subject vehicle entered the parking space. Since the device is configured to complement the information about the blind spot area for the surroundings environment information stored when the subject vehicle entered the parking space, the moving objects around the subject vehicle may not be detected when the subject vehicle goes out of the parking space. As described above, with the technique of the comparative example, it may be difficult to grasp the surroundings environment at the time of exiting the vehicle.

First Embodiment

A parking assistance device according to a first embodiment will be described with reference to FIGS. 1 to 4. The parking assistance device of the first embodiment is included in an automated driving ECU 100 mounted in a subject vehicle A. The automated driving ECU 100 is an electronic control device configured to realize automated driving functions for substituting driving operations of the subject vehicle A for the driver. The automated driving ECU 100 is configured to assist the parking of the subject vehicle A. The automated driving ECU 100 is connected with, through communication buses or the like, an external sensor 10, a sensor DB 20, a map DB 30, an in-vehicle communication device 40, a driving control device 50, a braking control device 60, and a steering control device 70.

The external sensor 10 is an autonomous sensor mounted on the subject vehicle A to detect objects around the subject vehicle A. The external sensor 10 is, for example, a surroundings monitoring camera whose capturing range is in the vicinity of the subject vehicle A. The external sensor 10 may be LiDAR (Light Detection and Ranging/Laser Imaging Detection and Ranging) configured to detect a point group of the feature points of objects. The external sensor 10 may include a millimeter wave radar, sonar, and the like. The external sensor 10 is configured to sequentially provide the detection information to the automated driving ECU 100.

The sensor DB 20 is a non-volatile memory and stores sensor information related to the external sensor 10 mounted on the subject vehicle A. The sensor DB 20 stores at least information required for calculating a blind spot area Ab described later. When the external sensor 10 is the surroundings monitoring camera, the sensor DB 20 stores, as the sensor information, a position to which the surroundings monitoring camera is attached and an angle of view of the surroundings monitoring camera.

The map DB 30 is a nonvolatile memory and stores map data such as link data, node data, road shapes, buildings and the like. The map data contains at least positions of parking spaces and shapes around the parking spaces in a parking lot. The map data may include a three-dimensional map including feature points of road shapes and buildings. The three-dimensional map may be generated based on a captured image by REM (Road Experience Management). The map data stored in the map DB 30 updates regularly or at any time based on the latest information received by the in-vehicle communication device 40.

The in-vehicle communication device 40 is a communication module mounted on the subject vehicle A. The in-vehicle communication device 40 has at least a V2N (Vehicle to cellular Network) communication function in line with communication standards such as LTE (Long Term Evolution) and 5G, and sends and receives radio waves to and from base stations around the subject vehicle A. The in-vehicle communication device 40 may further have functions such as road-to-vehicle (Vehicle to roadside Infrastructure) communication and inter-vehicle (Vehicle to Vehicle, hereinafter "V2V") communication. The in-vehicle communication device 40 enables cooperation between a cloud and in-vehicle system (Cloud to Car) by V2N communication. By installing the in-vehicle communication device 40, the subject vehicle A is able to connect to the Internet.

The driving control device 50, the braking control device 60, and the steering control device 70 are traveling control devices configured to output a control signal to traveling control devices mounted in the subject vehicle A. The devices 50, 60, 70 are configured to control the traveling control devices to realize the autonomous driving or the driving assistance based on the control instructions acquired from the automated driving ECU 100. Specifically, the driving control device 50 is configured to output the control signal to an electronic control throttle to control acceleration. The braking control device 60 is configured to output the control signal to a braking actuator to control braking.

The steering control device 70 is configured to output the control signal to an EPS (Electric Power Steering) motor to control steering.

The automated driving ECU 100 is configured to assist parking of the subject vehicle A based on the information acquired from the external sensor 10, the sensor DB 20, the map DB 30, and the like. The automated driving ECU 100 mainly includes a memory 101, a processor 102, an input/output interface, a bus connecting these components, and the like. The processor 102 is a hardware for arithmetic processing. The processor 102 includes, as a core, at least one type of, for example, a CPU (Central Processing Unit), a GPU (Graphics Processing Unit), an RISC (Reduced Instruction Set Computer) CPU, and so on.

The memory 101 is at least one type of non-transitory tangible storage medium, such as a semiconductor memory, a magnetic storage medium, and an optical storage medium, for non-transitory storing or memorizing computer readable programs and data. The memory 101 stores various programs executed by the processor 102, such as a parking assistance program described later.

The processor 102 executes a plurality of instructions included in the parking assistance program stored in the memory 101. As a result, the automated driving ECU 100 builds a plurality of functional units for assisting parking of the subject vehicle A. As described above, in the automated driving ECU 100, the program stored in the memory 101 causes the processor 102 to execute a plurality of instructions, thereby constructing a plurality of functional units. Specifically, the automated driving ECU 100 includes an object recognition unit 110, a blind spot area calculation unit 120, a parking position determination unit 130, a parking control unit 140, and the like.

The object recognition unit 110 is configured identify objects around the subject vehicle A based on the detection information from the external sensor 10. Specifically, the object recognition unit 110 identify positions and shapes of objects that may cause the blind spot area Ab, such as another vehicle B. The object identification unit 110 may identify the object based on information from vehicle-to-vehicle communication with the other vehicles B or network communication with the traffic center. The object identification unit 110 is configured to sequentially provide the identification information to the blind spot area calculation unit 120.

The blind spot area calculation unit 120 is configured to acquire the blind spot area Ab of the vehicle A. The blind spot area Ab is an area where objects in the blind spot area Ab are not recognized by the subject vehicle A. For example, the blind spot area Ab is an area out of the detection range of the external sensor 10. The blind spot area calculation unit 120 is configured to acquire the size of the blind spot area Ab by calculation based on the sensor information from the sensor DB 20, the map data from the map DB 30, and the identification information from the object identification unit 110.

The blind spot area calculation unit 120 is configured to calculate, as the blind spot area Ab, an area where is out of a detectable area As of the external sensor 10 of the parked subject vehicle A. For example, the blind spot area calculation unit 120 is configured to determine a road area Ar continuing to the parking space Sa planned for the subject vehicle A, and estimate the blind spot area Ab by excluding, from the road area Ar, the overlapping parts of the road area Ar and the detectable area As of the external sensor 10. The parking space Sa planned for the subject vehicle A may be set by detecting by the external sensor 10 during the automated driving, or by an instruction from the traffic center. The blind spot area calculation unit 120 is configured to calculate the blind spot area Ab for each parking position candidate set by the parking position determination unit 130.

The road area Ar is an area of the road into which the subject vehicle A enters when leaving the parking space Sa, and is defined based on the map data. A range of the road area Ar is set as, for example, a range that may affect the behavior of the subject vehicle A leaving the parking spot when the other vehicles B exist in the road area Ar.

The detectable area As is calculated based on the sensor information and the identification information. Specifically, the detectable area As is an area which can be captured without being blocked by objects when a specific angle range is captured from a camera position of the subject vehicle A parked at a specific parking spot.

Figure 3:
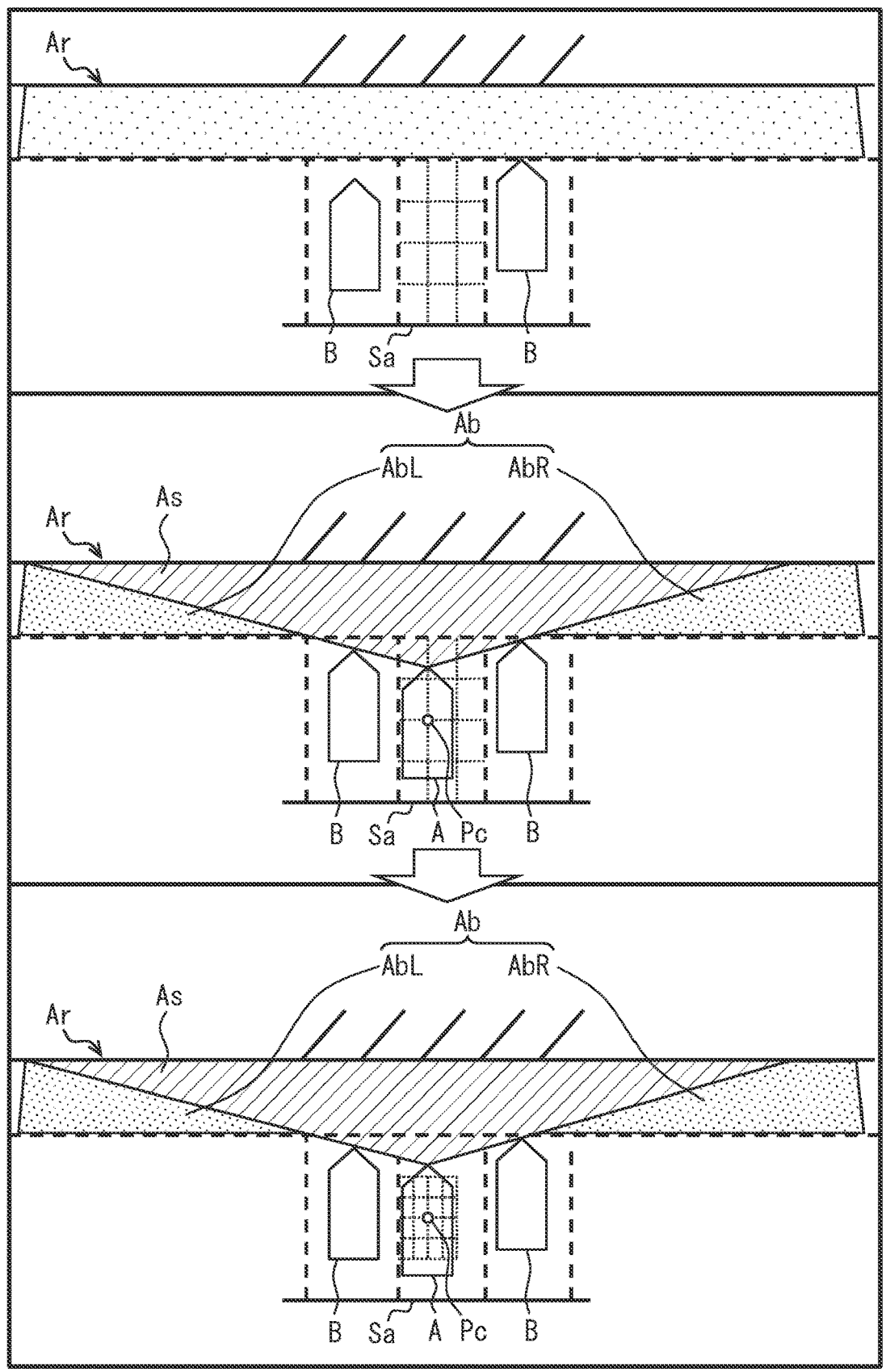
FIG. 3 is a diagram schematically illustrating a method for determining a parking spot.

The blind spot area calculation unit 120 is configured to calculate the size (area) of the blind spot area Ab based on the road area Ar and the detectable area As. For example, when the other vehicles B are parked on both sides of the parking space Sa of the subject vehicle A as shown in FIG. 3, the other vehicles B make two blind spot areas AbL, AbR. In this case, the blind spot area calculation unit 120 calculates the size of the entire blind spot area Ab by adds up the sizes of the blind spot areas AbL, AbR. The blind spot area calculation unit 120 is configured to sequentially provide the calculated size of blind spot area Ab to the parking position determination unit 130.

The parking position determination unit 130 is configured to determine the parking position of the subject vehicle A that satisfies a predetermined condition related to the size of the blind spot area Ab based on the blind spot area Ab calculated by the blind spot area calculation unit 120. For example, the parking position determination unit 130 is configured to determine, the parking position that satisfies the predetermined condition, a specific position where the size of the blind spot area Ab is at or below an acceptable value. Specifically, the parking position determination unit 130 is configured to determine, as the parking position, a position from parking position candidates where the size of the blind spot area Ab is the minimum value. In this case, the minimum value is an example of the acceptable value. In the present embodiment, the predetermined condition is an acceptable condition where the size of the blind spot area Ab is acceptable.

The parking position determination unit 130 is configured to determine the parking position that satisfies the acceptable condition based on a grid search method. In detail, the parking position determination unit 130 first assumes imaginary grid lines that divide the parking space Sa of the vehicle A into grids (FIG. 3, upper part). Any value can be set for the pitch of the grid. The parking position determination unit 130 is configured to set the intersections of grid lines (lattice points) as the parking position candidates. However, the parking position determination unit 130 excludes, from the parking position candidates, the lattice points where the subject vehicle A protrudes from the parking space Sa when the subject vehicle A is parked. The parking position determination unit 130 may be configured to determine whether the subject vehicle A protrudes from the parking space Sa in an assumption in which the center of gravity of the vehicle A matches the lattice point.

The parking position determination unit 130 provides information of each parking position candidate to the blind spot area calculation unit 120. When the size of the blind spot areas Ab for each parking position candidate is calculated by the blind spot area calculation unit 120, the parking position determination unit 130 selects a minimum parking position candidate Pc at which the size of the blind spot area Ab is the minimum (see the middle part of FIG. 3). Next, the parking position determination unit 130 further divides four grids adjacent to the minimum parking position candidate Pc, and provides newly generated lattice points to the blind spot area calculation unit 120 as new parking position candidates (see the lower part of FIG. 3). The four grinds adjacent to the minimum parking position candidate Pc is four adjacent grinds whose center is the minimum parking position candidate Pc.

The parking position determination unit 130 repeatedly performs the above process until the size of the grid falls within a predetermined acceptable range. The parking position determination unit 130 is configured to fix, as the actual parking position, the lattice point (minimum parking position candidate Pc) of the grid whose size falls within the acceptable range, at which the size of the blind spot area Ab is the minimum. The parking position determination unit 130 provides the fixed parking position to the parking control unit 140. The parking position determination unit 130 may determine the lattice point as the parking position when the size of the blind spot area Ab falls with a predetermined range. In this case, the acceptable condition is that the size of the blind spot area Ab is within the predetermined range.

The parking control unit 140 is configured to generate a control instruction to execute parking of the subject vehicle A at the fixed parking position. For example, the parking control unit 140 is configured to generate a parking trajectory that is a traveling trajectory from the current position of the subject vehicle A to the parking position. The parking control unit 140 is configured to provide, as the control instructions, a control instruction, a driving instruction, and a steering instruction required for the driving of the subject vehicle A along the parking trajectory to the driving control device 50, the braking control device 60, and the steering control device 70. Accordingly, the parking control unit 140 assists the parking of the subject vehicle A at the parking position. When the parking trajectory does not meet a predetermined constraint, the parking control unit 140 may stop the parking along the parking trajectory. In this case, the blind spot area calculation unit 120 and the parking position determination unit 130 reset the parking position. The constraint is, for example, that the number of steering turns is less than a predetermined number of times. The parking control unit 140 is an example of a parking assistance unit.

Figure 4:
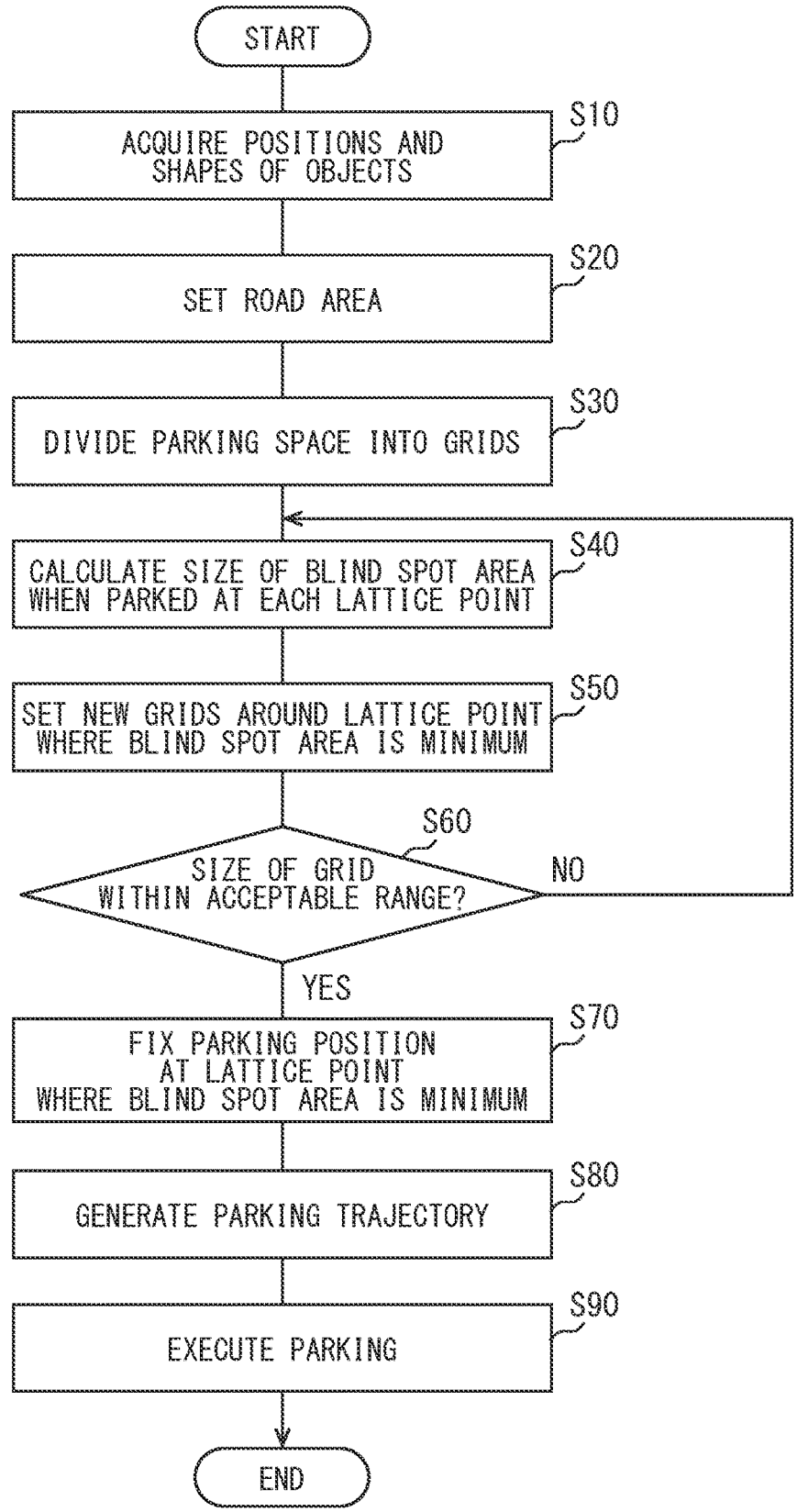
FIG. 4 is a flowchart illustrating the parking assistance method performed by the parking assistance device.

Next, the flowchart of the parking assistance method executed by the automated driving ECU 100 in collaboration with the functional blocks will be described below according to FIG. 4. In a flowchart to be described later, "S" means multiple steps of the flowchart to be executed by multiple instructions included in the parking assistance program. The automated driving ECU 100 is configured to start the following flow when the subject vehicle A approaches the parking space Sa.

In S10, the object identification unit 110 acquires positions and shapes of objects around the parking space Sa of the subject vehicle A based on the detection information of the external sensor 10. In S20, the blind spot area calculation unit 120 sets the road area Ar based on the map data. In S30, the parking position determination unit 130 divides the parking space Sa into grids. In S40, the blind spot area calculation unit 120 calculates the size of the blind spot area for each lattice point. In S50, the parking position determination unit 130 sets new grids around the lattice point (minimum parking position candidate Pc) at which the size of the blind spot area Ab is the minimum.

In S60, the parking position determination unit 130 determines whether the size of the grid set in S50 is within the acceptable range. When it is determined that the size of the grid is not within the acceptable range, the process returns to S40, and the blind spot area Ab for each lattice point of new grids is calculated. In contrast, it is determined in S60 that the size of the grid is within the acceptable range, the process proceeds to S70, and the parking position determination unit 130 fixes, as the parking position, the lattice point having the smallest blind spot area Ab.

In S80, the parking control unit 140 is configured to generate a traveling trajectory (parking trajectory) from the current position of the subject vehicle A to the parking position. In S90, the parking control unit 140 generates the control instructions for following the parking trajectory and outputs them to the control devices to executes the parking. After S90, the automated driving ECU 100 ends the process.

S40 is an example of a calculation process, S20, S30, S50, S60, S70 are an example of a determination process, and S80, S90 are an example of an assistance process.

According to the first embodiment, the parking position that satisfies the predetermined condition related to the size of the blind spot area Ab of the subject vehicle A is determined in the planned parking space of the subject vehicle A, and the parking at the determined parking position is assisted. Accordingly, the subject vehicle A can be parked in consideration of the size of the blind spot area Ab, which makes easier to grasp the surroundings environment when the subject vehicle A leaves the parking space. That is, it is possible to reliably grasp the surroundings environment when the subject vehicle A leaves the parking space. Particularly, in the first embodiment, since the position where the size of the blind spot area Ab is at or smaller than the acceptable value (minimum value) is determined as the parking position, the range which can be directly grasped when the subject vehicle A leaves the parking spot is large.

According to the first embodiment, the lattice points of the grids set in the parking space Sa of the subject vehicle A are used as the parking position candidates, and one lattice point at which the blind spot area Ab is the smallest is determined as the parking position. According to this, since the parking position is determined by simply comparing the size of the blind spot area Ab of each lattice point which is the parking position candidate, the calculation may be simply compared to a case where the position having the smallest blind spot area Ab is calculated by an arithmetic analysis.

Second Embodiment

Figure 5:
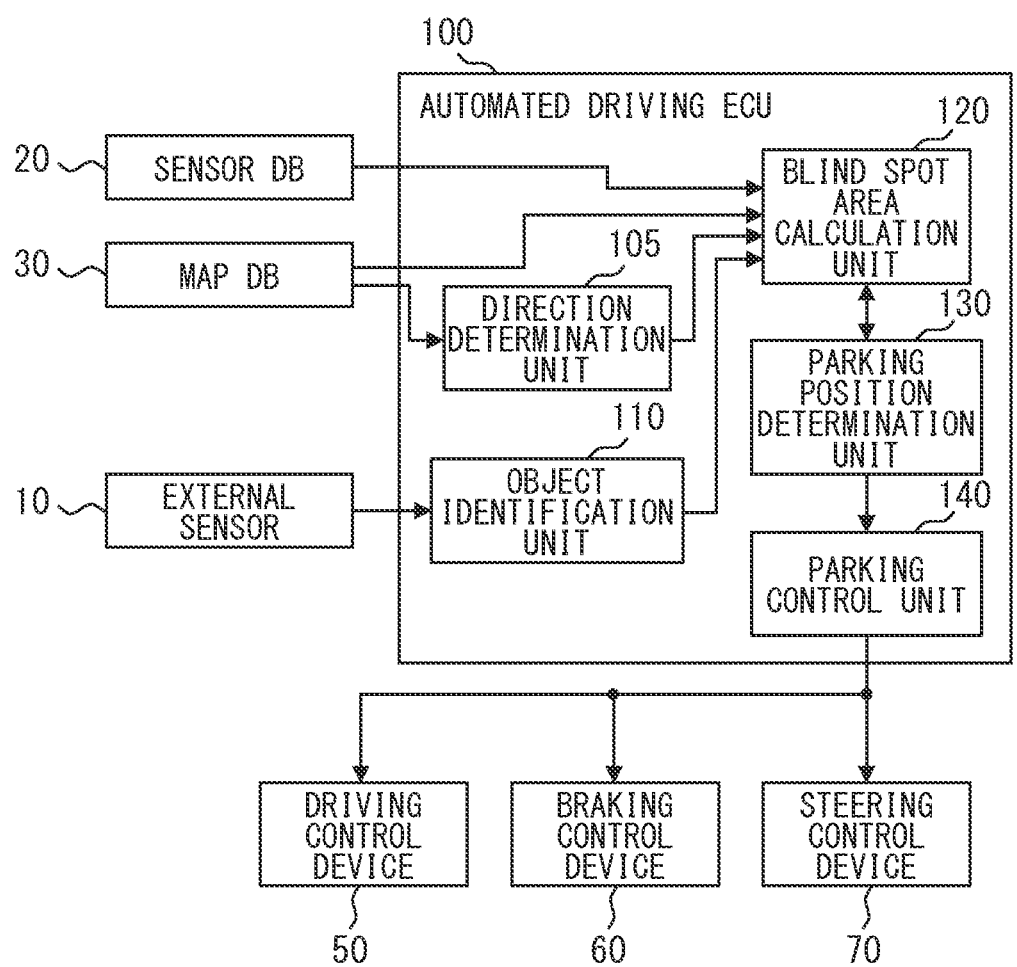
FIG. 5 is a block diagram illustrating an example of functions of a parking assistance device according to a second embodiment.
Figure 6:
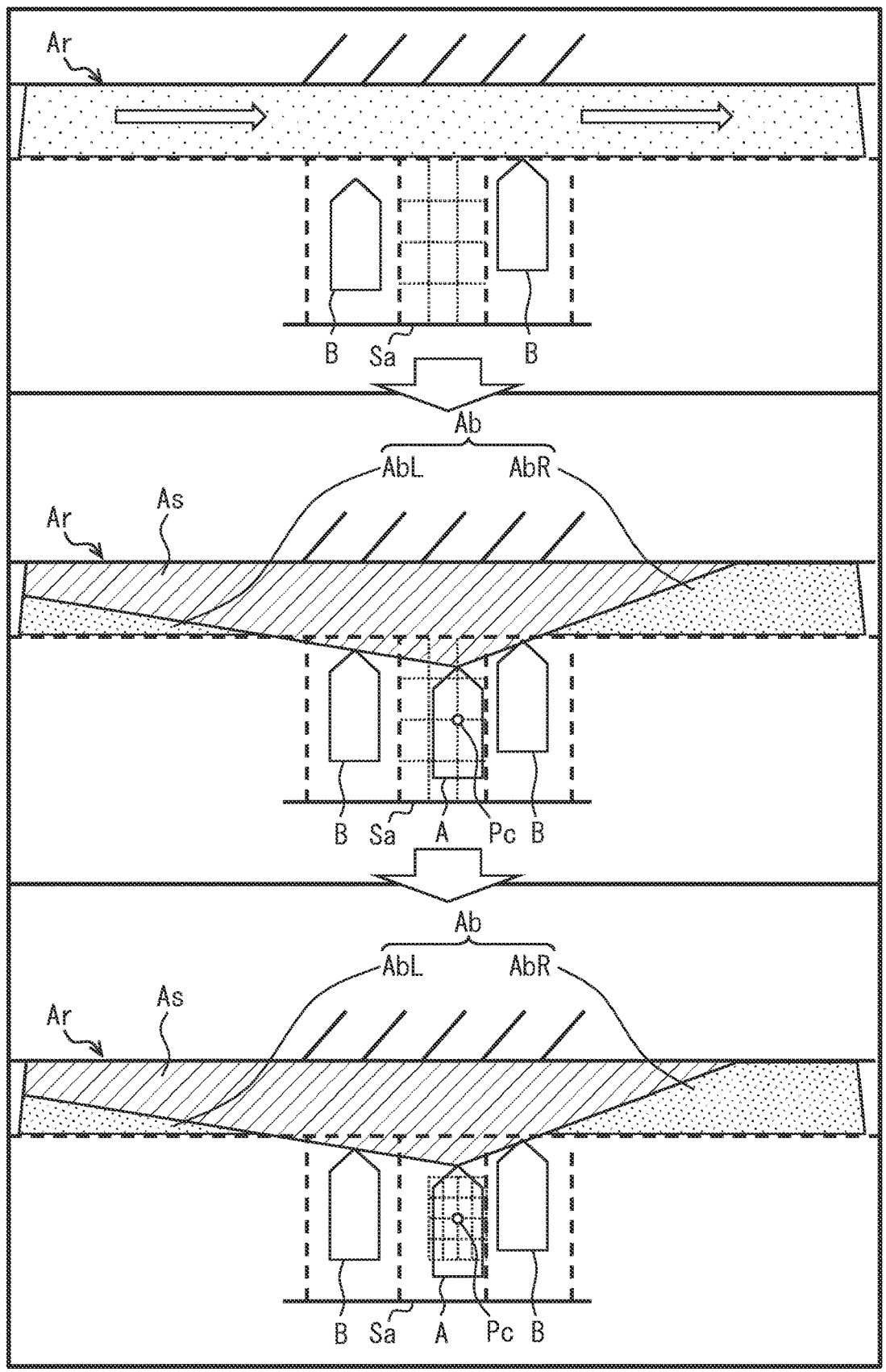
FIG. 6 is a diagram schematically illustrating a method for determining a parking spot according to the second embodiment.
Figure 7:
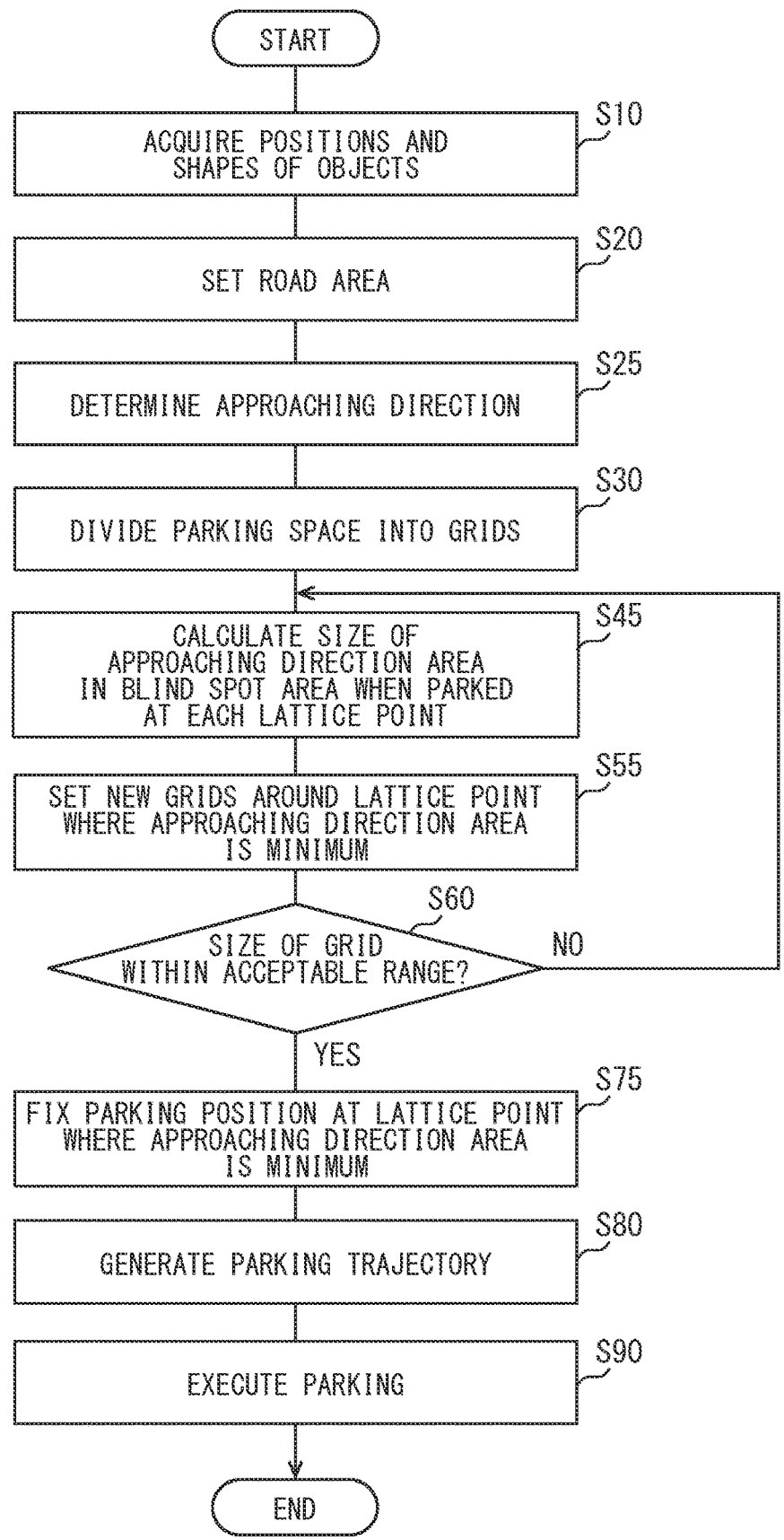
FIG. 7 is a flowchart illustrating the parking assistance method performed by the parking assistance device according to the second embodiment.

In a second embodiment, a modification example of the automated driving ECU 100 described in the first embodiment will be described with reference to FIGS. 5-7. In the second embodiment, the automated driving ECU 100 includes a direction determination unit 105 in addition to the functional units of the first embodiment.

The direction determination unit 105 is configured to determine an approaching direction in which the other vehicle approaches the subject vehicle A on the road. The direction determination unit 105 is configured to determine the approaching direction based on the map data acquired from the map DB. Specifically, when information defining an existence direction of the other vehicle that would approach the subject vehicle A such as a one-way street is contained in the map data, the direction determination unit 105 determines the existence direction as the approaching direction. Alternatively, the direction determination unit 105 may be configured to estimate the approaching direction based on the road structure in the map data, the positions of buildings, and the positions of pedestrian crossings. The direction determination unit 105 may be configured to acquire operation information of the other vehicles from the traffic center or the like to determine the approaching direction based on the operation information. The direction determination unit 105 is configured to provide information of the approaching direction to the blind spot area calculation unit 120. The direction determination unit 105 is an example of an approaching direction estimation unit.

The blind spot area calculation unit 120 of the second embodiment is configured to calculate the size of an area that exists in the blind spot area Ar in the approaching direction. When the blind spot areas Ab exist on both sides of the detectable area as shown in FIG. 6, the blind spot area calculation unit 120 determines, as an approaching direction area, the blind spot area AbL located on the approaching direction side of the detectable area As. The parking position determination unit 130 is configured to fix, as the parking position, the lattice point at which the size of the approaching direction area is the minimum (minimum parking position candidate Pc). In this case, the predetermined condition is that the size of the approaching direction area is at or below the acceptable value, and the minimum value is an example of the acceptable value.

The flow of the parking assistance method executed jointly by the functional blocks of the second embodiment will be described below with reference to FIG. 7. As for the steps with the same reference numerals as the first embodiment, the description in the embodiments below is incorporated.

In S25 subsequent to S10 and S20, the direction determination unit 105 determines the approaching direction of the other vehicle on the road. In S45 subsequent to S30, the blind spot area calculation unit 120 calculate the size of the approaching direction area in the blind spot area Ab based on the information about the approaching direction. In S55, the parking position determination unit 130 sets new grids around the lattice point (minimum parking position candidate Pc) at which the size of the approaching direction area is the minimum. In S75 subsequent to S60, the parking position determination unit 130 fixes, as the parking position, the lattice point determined in S30-60 at which the approaching direction area is the smallest. After S75, the process proceeds to S80-S90. S25 is an example of an approaching direction estimation process.

According to the second embodiment, the approaching direction of the other vehicle traveling on the road to which the subject vehicle A enters when the subject vehicle A leaves the parking space. The position where the size of the approaching direction area located on the approaching direction side of the blind spot area Ab is the smallest is determined as the parking position. Accordingly, the size of the area in the blind spot area Ab in a direction to which the driver should pay particular attention when leaving the parking space can be small. The parking position determined in this case is not necessarily the position where the entire blind spot area Ab is minimized.

Third Embodiment

In a third embodiment, a modification example of the automated driving ECU 100 described in the first embodiment will be described. In the third embodiment, the automated driving ECU 100 is configured to adjust the parking position of the subject vehicle A according to changes in positions of objects around the subject vehicle A after parking.

Specifically, the object identification unit 110 is configured to determine whether the objects around the subject vehicle A moves after parking. Especially, the object identification unit 110 is configured to determine whether the other vehicle B parked around the subject vehicle A has moved. For example, when the other vehicle B parked around the subject vehicle A left the parking space, when another vehicle has parked at the parking space where the other vehicle B has been, when the change of the position of the other vehicle B after it is started to park the subject vehicle A is out of a predetermined range, and the like, the object identification unit 110 determines that the other vehicle B has moved. The object identification unit 110 is configured to sequentially provide, as the other vehicle information to the blind spot area calculation unit 120, the position, the shape, and the like of the other vehicle B after the other vehicle B has moved.

The blind spot area calculation unit 120 and the parking position determination unit 130 are configured to calculate again the blind spot area Ab based on the other vehicle information to fix the parking position where the blind spot area Ab is the smallest. The parking position determination unit 130 may be configured to set constraint which limits new parking position in a range at which the subject vehicle can arrive by only moving the subject vehicle inside the parking space Sa.

Figure 8:
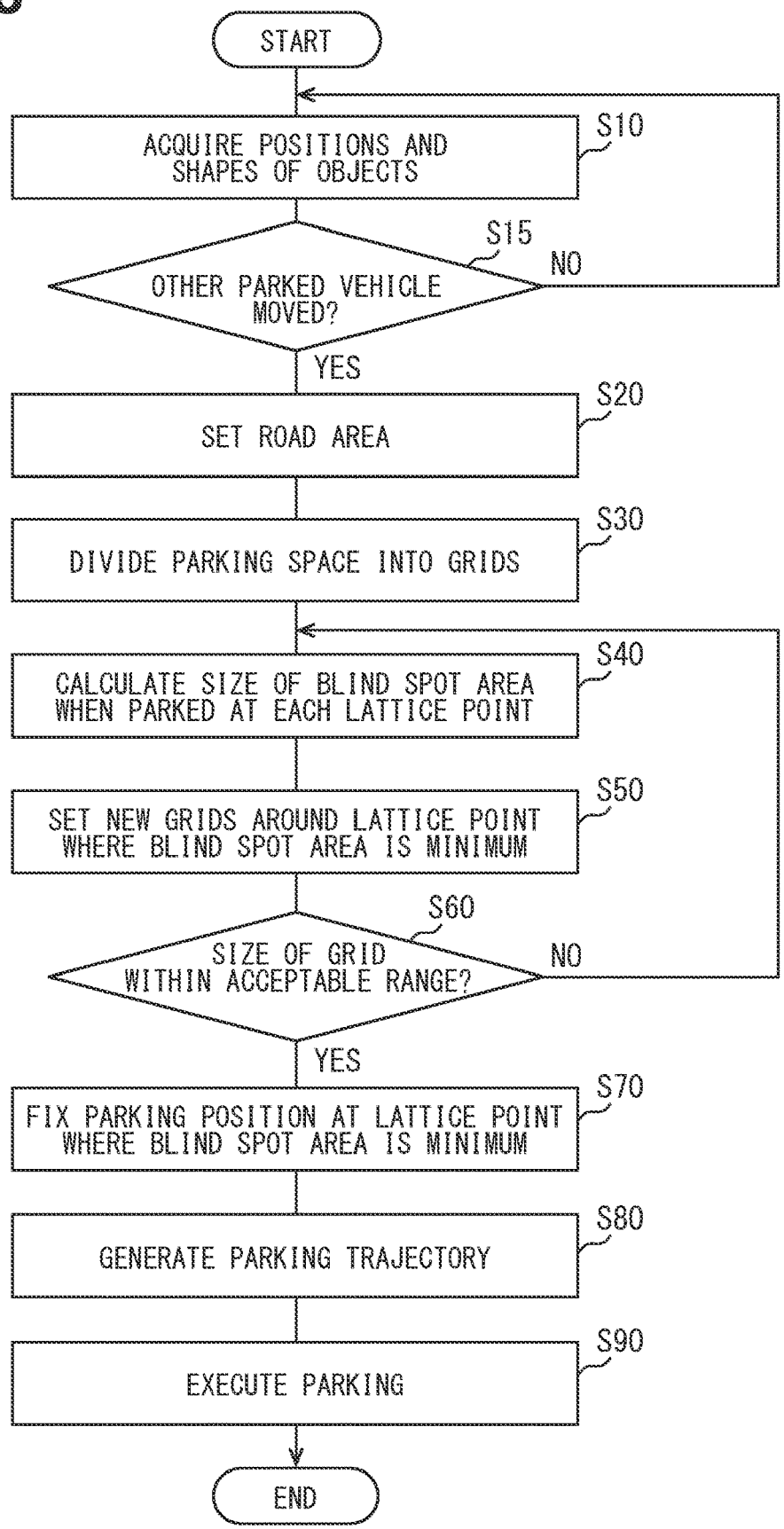
FIG. 8 is a flowchart illustrating a parking assistance method performed by a parking assistance device according to a third embodiment.

The flow of the parking assistance method executed jointly by the functional blocks of the third embodiment will be described below with reference to FIG. 8. A series of processes shown in FIG. 8 are started after the parking of the subject vehicle A in the parking space Sa is completed.

In S15 subsequent to S10, the object identification unit 110 determines whether the other vehicle B parked around the subject vehicle A has moved. When it is determined that the other vehicle B has not moved, the process returns to S10 and proceeds to S20-S90.

According to the third embodiment, the parking position where the size of the blind spot area Ab is within the acceptable range is determined again when the movement of the other vehicle B around the subject vehicle A is detected after the subject vehicle A is parked. Then, the movement of the subject vehicle A to the re-determined parking position is assisted. Therefore, even if the other vehicle B parked in the vicinity moves after the subject vehicle A is parked, the parking position is updated so that the blind spot area Ab becomes smaller. Therefore, the relatively small blind spot area Ab can be maintained until the vehicle leaves the vehicle.

Fourth Embodiment

Figure 9:
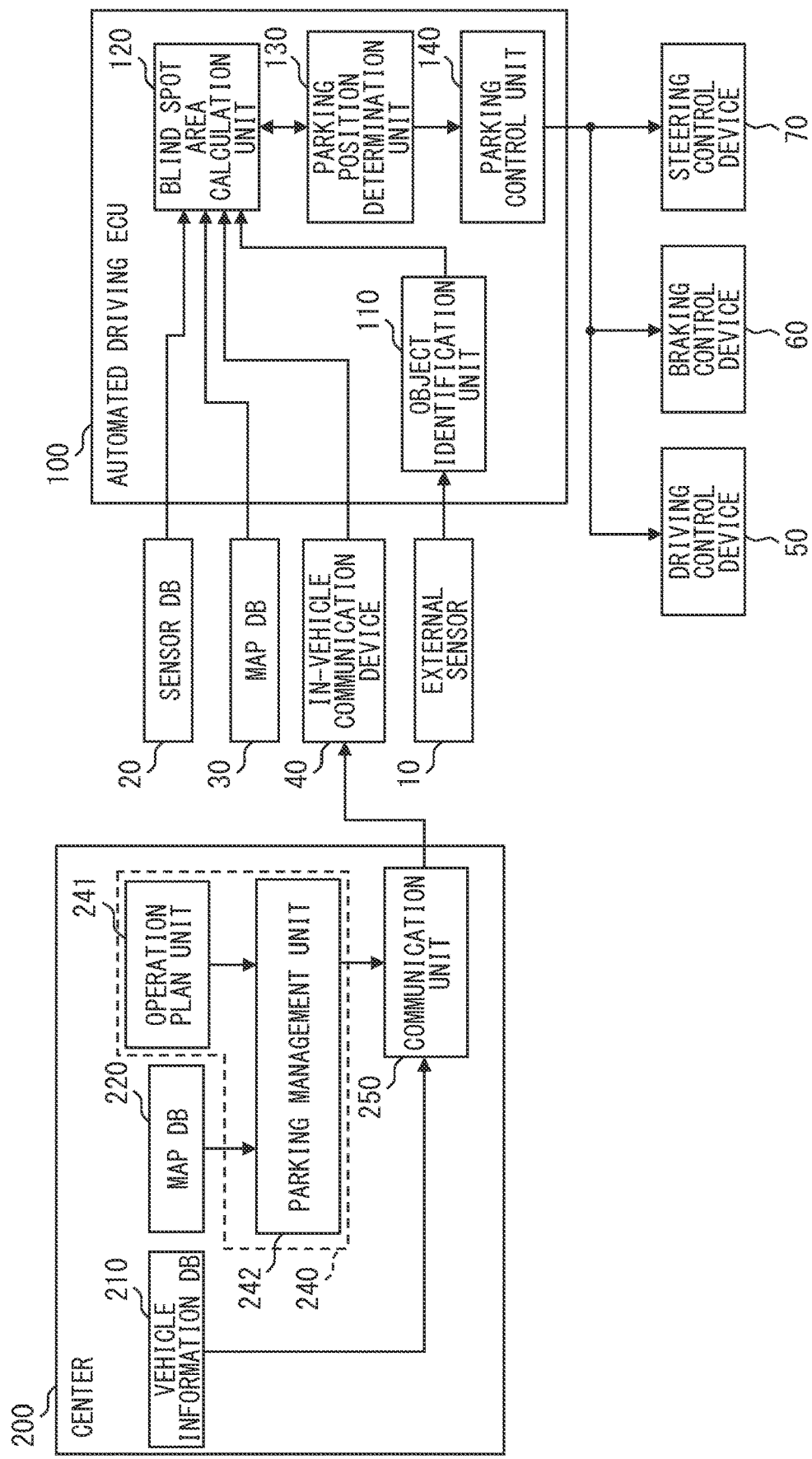
FIG. 9 is a block diagram illustrating an example of functions of a parking assistance device according to a fourth embodiment.
Figure 10:
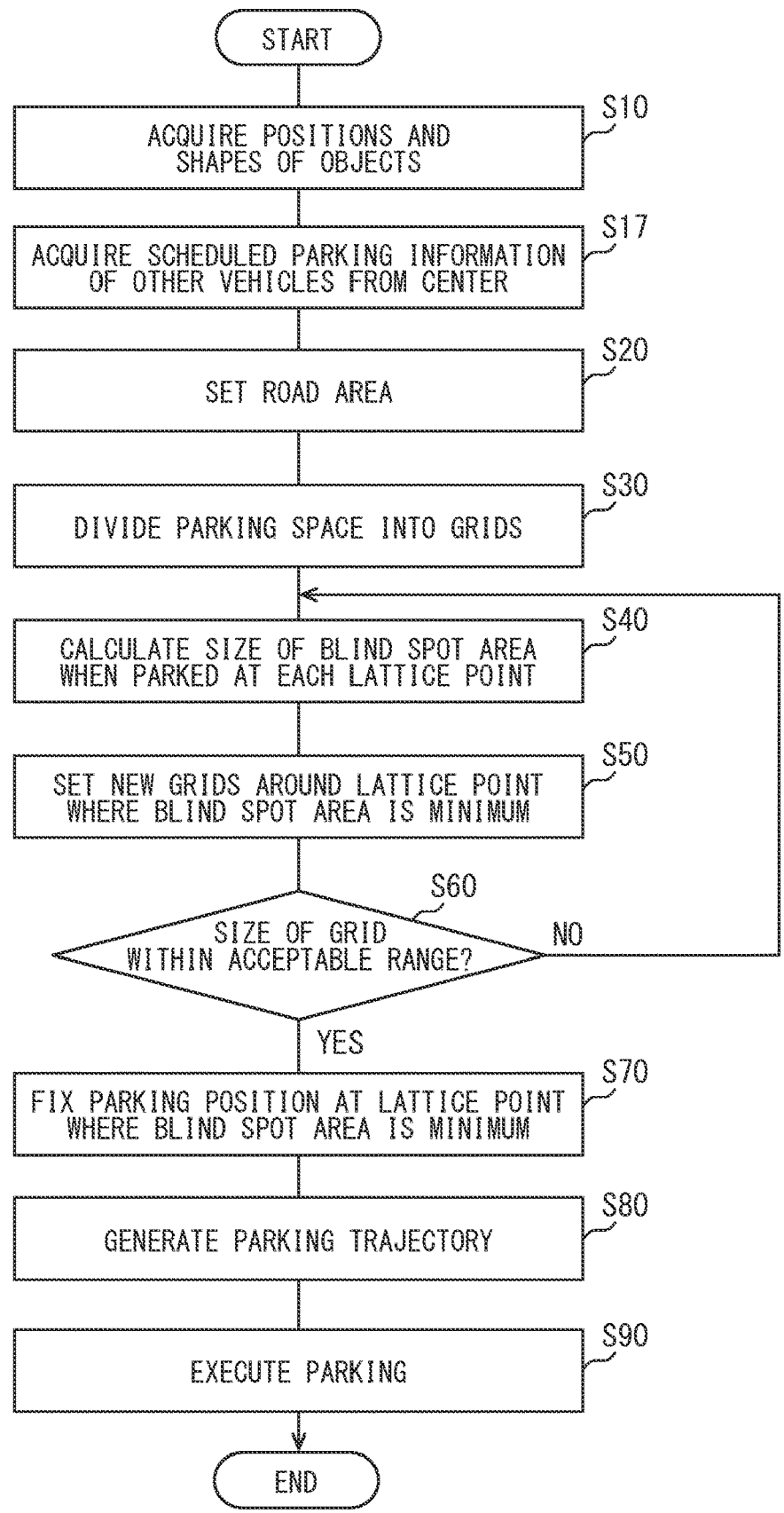
FIG. 10 is a flowchart illustrating a parking assistance method performed by a parking assistance device according to the fourth embodiment.

In a fourth embodiment, a modification example of the automated driving ECU 100 described in the first embodiment will be described with reference to FIGS. 9, 10. In the fourth embodiment, the automated driving ECU 100 is configured to communicate with a center 200 through the in-vehicle communication device 40.

The center 200 is a server device configured to manage operation of vehicles. The vehicles whose operations are managed by the center 200 may include the subject vehicle A or may not include the subject vehicle A. The center 200 includes a vehicle information DB 210, a map DB 220, a center control unit 240, a communication unit 250 configured to communicate with the in-vehicle communication device 40 of the subject vehicle A through communication network.

The vehicle information DB 210 is a non-volatile memory and stores target vehicle information related to vehicles (target vehicles) whose operations are managed. The target vehicle information contain information related to sizes and shapes of the target vehicles. The map DB 220 is a non-volatile memory that stores the map data similarly to the map DB 30 of the subject vehicle A.

The center control unit 240 mainly includes, similarly to the automated driving ECU 100, a memory, a processor, an input/output interface, a bus connecting these components, and the like. The memory stores a management program for manage operations of the vehicles. The center control unit 240 constructs multiple functional units by causing the processor to execute the multiple instructions. Specifically, the center control unit 240 builds functional units such as an operation plan unit 241, a parking management unit 242, and the like.

The operation plan unit 241 is configured to generate an operation plan for the target vehicles to be managed. The operation plan contains a traveling path and an scheduled arrival time to a destination (e.g. parking lot), a scheduled departure time to the next destination, and the like.

The parking management unit 242 is configured to manage parking of the target vehicles. The parking management unit 242 is configured to determine the parking spaces for the target vehicles to be parked in the parking lot based on the operation plan and the map data of the map DB 220. For example, the parking management unit 242 is configured to allocate the parking spaces such that the target vehicles do not interfere with each other based on scheduled arrival times at the parking lot and scheduled departure times from the parking lot of the target vehicles. The parking management unit 242 may be configured to determine the scheduled parking position in the allocated parking space. The parking management unit 242 is configured to provide, as scheduled parking information to the subject vehicle A through the communication unit 250, information related to the scheduled arrival times, the scheduled departure times, and the allocated parking spaces of the target vehicles. The scheduled parking information is an example of a prediction information.

The blind spot area calculation unit 120 of the automated driving ECU 100 is configured to calculate the size of the blind spot area Ab based on the scheduled parking information from the center 200 in addition to the identification information from the object identification unit 110. That is, the blind spot area calculation unit 120 is configured to calculate the size of the blind spot area Ab formed by the other vehicle B when the other vehicle B is predicted to be parked in a parking space at the scheduled departure time of the subject vehicle A. When the operation of the subject vehicle A is managed by the operation plan unit 241 of the center 200, the scheduled departure time of the subject vehicle A is acquired from the center 200. Alternatively, the automated driving ECU 100 may have a function to generate the operation plan of the subject vehicle A to set the scheduled departure time. When the scheduled parking information contains the scheduled parking position, the blind spot area calculation unit 120 calculates the size of the blind spot area Ab on the assumption that the other vehicles will be parked at the scheduled parking positions. When the scheduled parking information of the other vehicle B is not obtained, the blind spot area calculation unit 120 may be configured to calculate the size of the blind spot area Ab on an assumption that the other vehicle B is to be parked at a predetermined position such as a center of the parking space.

The flow of the parking assistance method executed jointly by the functional blocks of the fourth embodiment will be described below with reference to FIG. 10. In S17 subsequent to S10, the blind spot area calculation unit 120 acquires the scheduled parking information from the center 200. In S40 subsequent to S20, 30, the blind spot area calculation unit 120 calculates the size of the blind spot area based on the identification information and the scheduled parking information. After S40, the process proceeds to S50-S90.

According to the fourth embodiment, the blind spot area Ab is calculated based on the scheduled parking information related to the other vehicle B parked around the subject vehicle A at the scheduled departure time of the subject vehicle A. Accordingly, in determining the parking position, the blind spot area Ab formed by the other vehicle B which are not present around the subject vehicle A when the subject vehicle A is parked can be considered. Accordingly, the subject vehicle A can be parked at a position where the blind spot area Ab at the time of exit is more reliably reduced.

Fifth Embodiment

Figure 11:
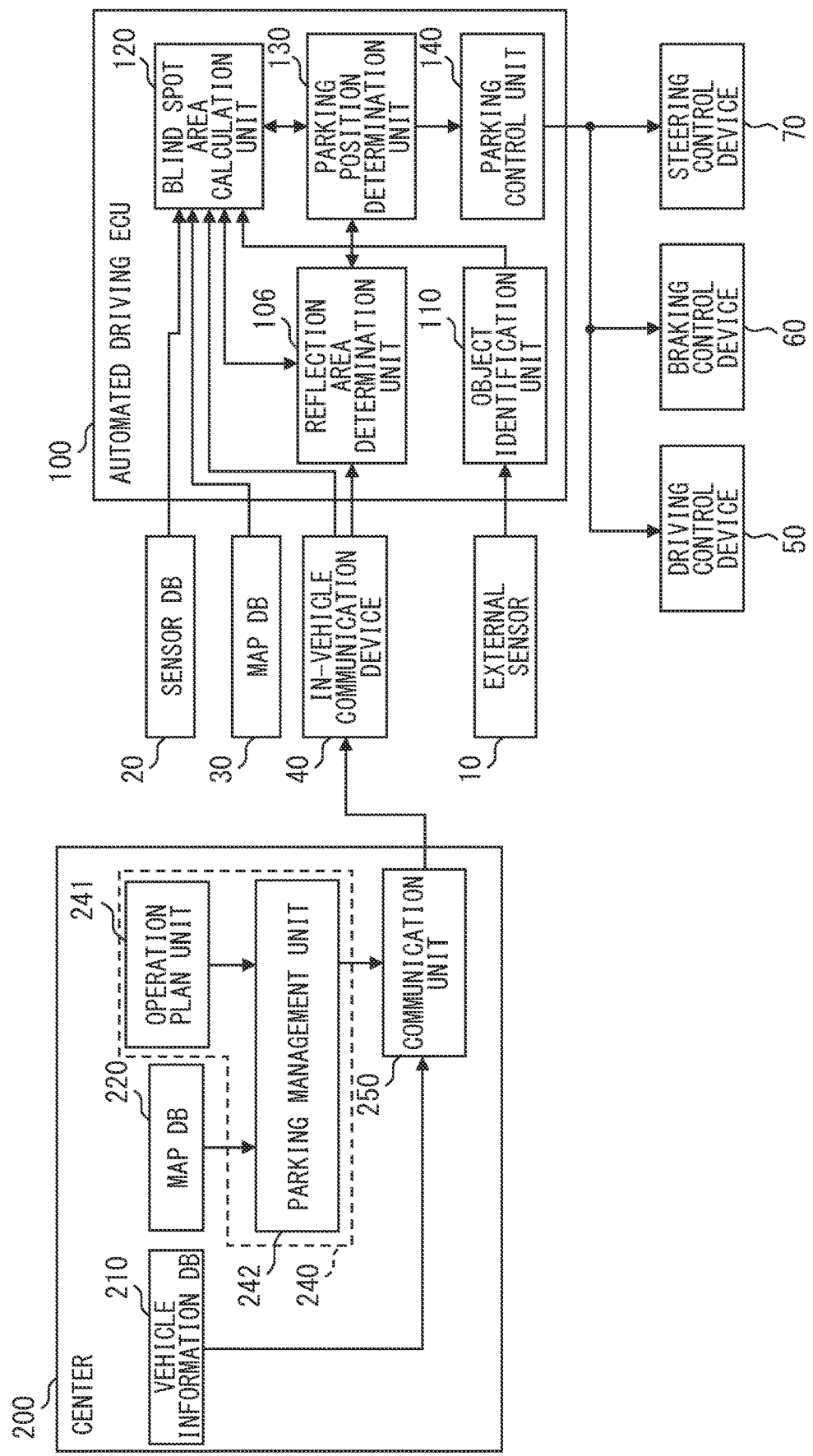
FIG. 11 is a block diagram illustrating an example of functions of a parking assistance device according to a fifth embodiment.
Figure 12:
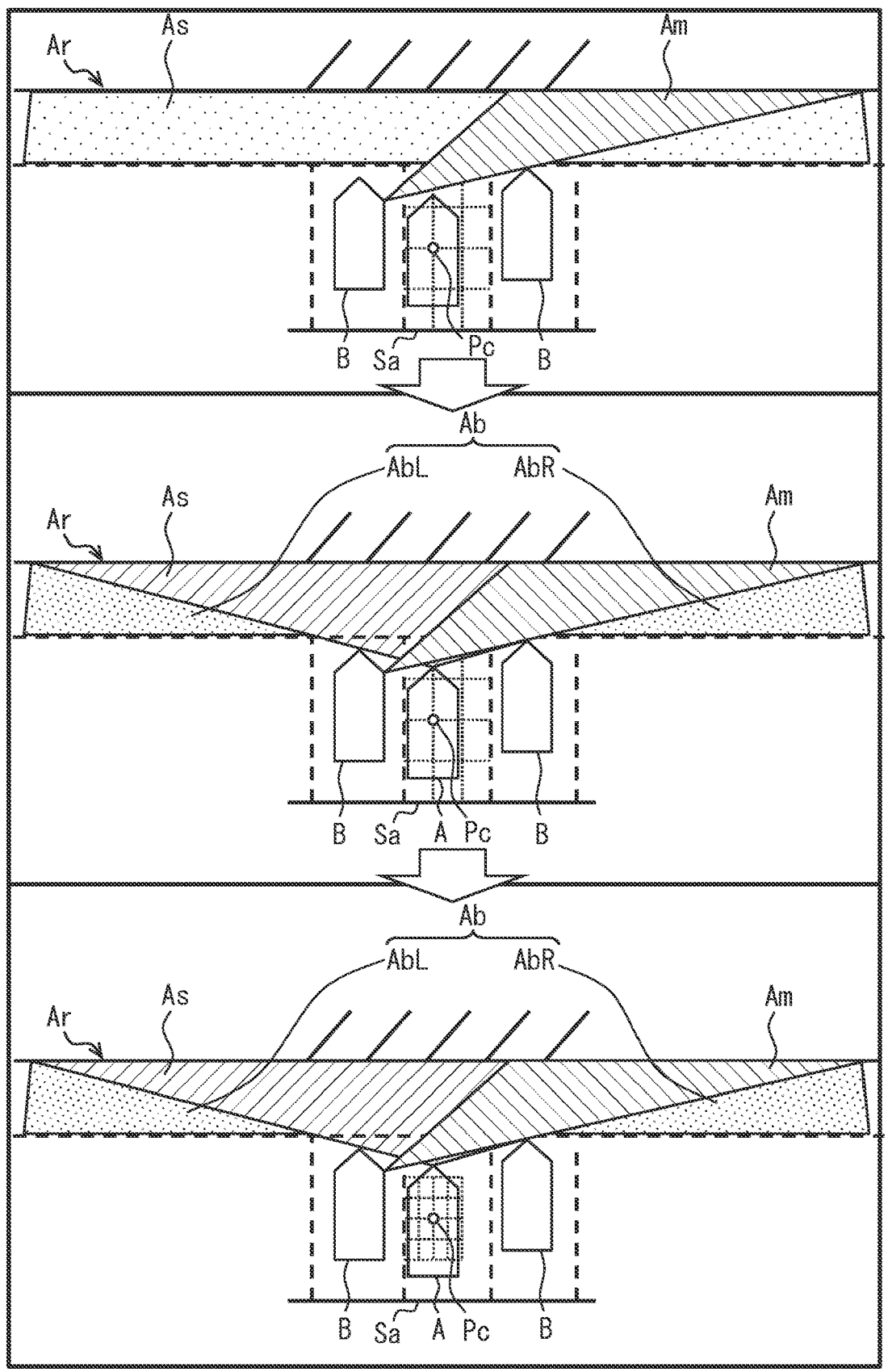
FIG. 12 is a diagram schematically illustrating a method for determining a parking spot according to the fifth embodiment.
Figure 13:
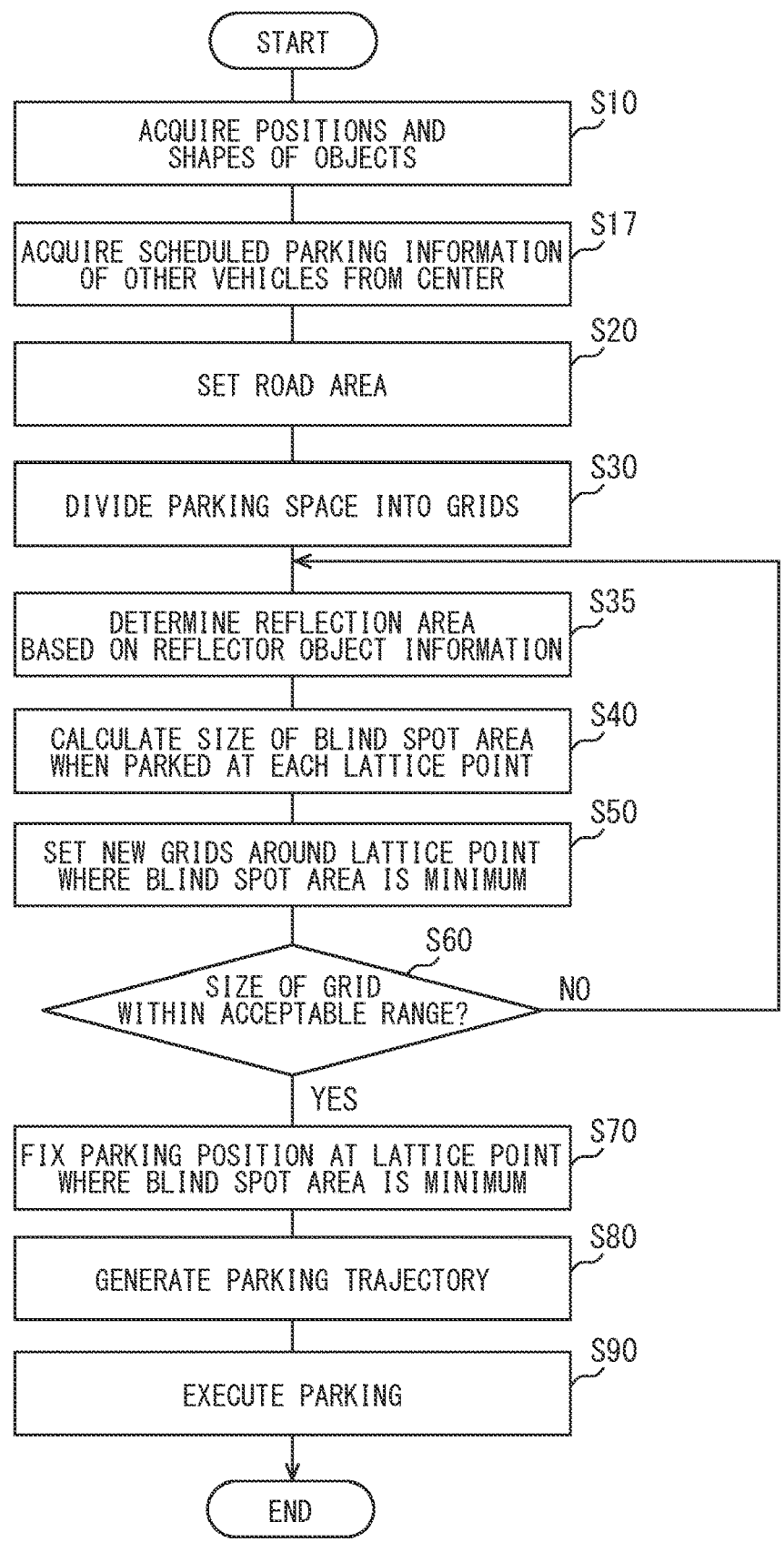
FIG. 13 is a flowchart illustrating a parking assistance method performed by a parking assistance device according to the fifth embodiment.

In a fifth embodiment, a modification example of the automated driving ECU 100 described in the fourth embodiment will be described with reference to FIGS. 11-13. In the fifth embodiment, the automated driving ECU 100 builds a reflection area determination unit 106 in addition to the functional units of the first embodiment. The vehicle information DB 210 of the center 200 contains reflector object information of the target vehicle.

The reflection area determination unit 106 is configured to acquire information related to a specular reflection objects existing around the parked subject vehicle A. The specular reflection objects are reflection objects that visibly reflects the surroundings such as a mirror of the other vehicle B, for example. The mirror may be a door mirror or another mirror. The reflection area determination unit 106 is configured to acquire the position, angle, shape, size, and the like of the specular reflection object. The information is acquired from the vehicle information DB 210 of the center 200, for example. The reflection area determination unit 106 may be configured to acquire the reflector object information by the vehicle-to-vehicle communication with the other vehicle B having the specular reflection object, or by analyzing the detection information of the external sensor 10.

The reflection area determination unit 106 is configured to determine a reflection area Am of the specular reflection objects based on the reflector object information. The reflection area Am is an area which can be captured by the surroundings monitoring camera using the reflection of the specular reflection object when the subject vehicle A is parked at the parking position candidate. The reflection area Am is an example of a recognizable area. The reflection area determination unit 106 is configured to provide the information of the calculated reflection area Am to the blind spot area calculation unit 120.

The blind spot area calculation unit 120 is configured to calculate the blind spot area Ab based on the identification information, the other vehicle parking information, and the determined reflection area Am. For example, the blind spot area calculation unit 120 is configured to calculate the size of the blind spot area Ab by excluding the detectable area As and the reflection area Am from the road area Ar (see FIG. 12).

The flow of the parking assistance method executed jointly by the functional blocks of the fifth embodiment will be described below with reference to FIG. 13. As for the steps with the same reference numerals as the fourth embodiment, the description in the fourth embodiment is incorporated.

In S35 subsequent to S10-S30, the reflection area determination unit 106 determines the reflection area Am based on the reflector object information acquired from the center 200. In S40, the blind spot area calculation unit 120 calculates the size of the blind spot area Ab based on the identification information, the other vehicle parking information, and the visible area. After S40, the process proceeds to S50-S90.

According to the fifth embodiment, the blind spot area Ab is calculated based on the reflection area Am of the reflector objects. According to this, the size of the blind spot area Ab is calculated in consideration of the reflection area Am. Accordingly, the subject vehicle A can be parked at a position where the blind spot area Ab is more reduced.

In the fifth embodiment, the reflection area determination unit 106 may be configured to control the position and the angle of the reflector objects. In this case, the reflection area determination unit 106 may be configured to determine the reflection area Am where it is the largest within the controllable range at each parking position candidate.

Other Embodiments

The disclosure in the present specification is not limited to the illustrated embodiments. The disclosure encompasses the illustrated embodiments and variations based on the embodiments by those skilled in the art. For example, the present disclosure is not limited to the combinations of components and/or elements shown in the embodiments. The present disclosure may be implemented in various combinations. The present disclosure may have additional members which may be added to the embodiments. The present disclosure encompasses the embodiments where some components and/or elements are omitted. The present disclosure encompasses replacement or combination of components and/or elements between one embodiment and another. The disclosed technical scope is not limited to the description of the embodiment. Several technical scopes disclosed are indicated by descriptions in the claims and should be understood to include all modifications within the meaning and scope equivalent to the descriptions in the claims.

In the above-described embodiments, the parking assistance device is configured by the automated driving ECU 100 configured to perform the driving operation of the subject vehicle A on behalf of the driver. Alternatively, the parking assistance device may be configured by a driving assistance ECU configured to assist the driving operation of the driver.

In the above-described embodiments, the parking position determination unit 130 is configured to determine the parking position based on the grid search method. Alternatively, the parking position determination unit 130 may be configured to calculate the parking position where the size of the blind spot area Ab is within the acceptable range by geometric analysis. In this case, the parking position determination unit 130 may set the size of the blind spot area Ab to be the minimum or within the acceptable range as the acceptable condition.

In the above-described embodiments, the parking control unit 140 is configured to assist the parking of the subject vehicle A by performing the driving control, the braking control, and the steering control to autonomously drive the subject vehicle A to the parking position. Alternatively, the parking control unit 140 may assist the driver to manually park the subject vehicle A at the parking position. For example, the parking control unit 140 may assist the parking of the subject vehicle A by substituting a part of the above-described controls for the driving of the driver. The parking control unit 140 may assist the parking of the subject vehicle A by guiding the driver to the parking position by displaying the parking position on a display in the vehicle compartment.

In the above-described embodiments, the blind spot area calculation unit 120 is configured to calculate the size of the blind spot area Ab as an area which cannot be detected by the external sensor 10. Alternatively, the blind spot area calculation unit 120 may be configured to calculate the size of the blind spot area Ab as an area which is invisible to the driver when the departure of the subject vehicle A is performed by the driver. In this case, the blind spot area calculation unit 120 may be configured to acquire the size of the blind spot area Ab based on the information related to the identification information and the viewpoint position of the driver. The viewpoint position may be a preset position or may be detected by an indoor camera.

The automated driving ECU 100 of the modification may be a special purpose computer configured to include at least one of a digital circuit and an analog circuit as a processor. In particular, the digital circuit is at least one type of, for example, an ASIC (Application Specific Integrated Circuit), a FPGA (Field Programmable Gate Array), an SOC (System on a Chip), a PGA (Programmable Gate Array), a CPLD (Complex Programmable Logic Device), and the like. Such a digital circuit may include a memory in which a program is stored.

The automated driving ECU 100 may be provided by a set of computer resources linked by a computer or a data communication device. For example, a part of the functions provided by the automated driving ECU 100 in the above-described embodiments may be realized by another ECU or the center.

What is claimed is:

1. A parking assistance device comprising:
    a processor;
    a non-transitory computer-readable storage medium; and
    a set of computer-executable instructions stored on the non-transitory computer-readable storage medium that cause the processor to:
    calculate a size of a blind spot area of a subject vehicle created when the subject vehicle is parked at a specific position in a parking space scheduled for the subject vehicle;
    determine, as a parking position, the specific position where a predetermined condition related to the size of the blind spot area is satisfied; and
    assist parking of the subject vehicle at the determined parking position,
    wherein
    assistance of the parking of the subject vehicle includes a traveling control of the subject vehicle.

2. The parking assistance device according to claim 1, wherein
    the set of computer-executable instructions further cause the processor to
    determine, as the parking position which is the specific position satisfying the predetermined condition, the specific position where the size of the blind spot area is at or below an acceptable value.

3. The parking assistance device according to claim 1, wherein
    the set of computer-executable instructions further cause the processor to:
    estimate an approaching direction from which another vehicle traveling on a road approaches the subject vehicle, the subject vehicle entering the road when the subject vehicle leaves the parking space, wherein
    calculate a size of an approaching direction area which is a part of the blind spot area located on an approaching direction side, and
    determine, as the parking position which is the specific position satisfying the predetermined condition, the specific position where the size of the approaching direction area is at or below an acceptable value.

4. The parking assistance device according to claim 1, wherein
    the set of computer-executable instructions further cause the processor to:
    determine again the parking position satisfying the predetermined condition when it is detected that another vehicle parked around the parking space has moved after the subject vehicle is parked, and
    assist moving the subject vehicle to the re-determined parking position.

5. The parking assistance device according to claim 1, wherein
    the set of computer-executable instructions further cause the processor to
    calculate the blind spot area based on information about another vehicle which is predicted to be parked around the parking space before a scheduled departure time from the parking space of the subject vehicle.

6. The parking assistance device according to claim 1, wherein
    the set of computer-executable instructions further cause the processor to
    calculate the blind spot area based on information about a recognizable area created by a reflector object which makes an environment around the subject vehicle to be recognizable by reflection of the reflector object.

7. A method for a processor to assist parking of a subject vehicle, the method comprising:
    calculating a size of a blind spot area of the subject vehicle created when the subject vehicle is parked at a specific position in a parking space scheduled for the subject vehicle;
    determining, as a parking position, the specific position where a predetermined condition related to the size of the blind spot area is satisfied; and
    assisting parking of the subject vehicle at the determined parking position,
    wherein
    the assisting of parking of the subject vehicle includes a traveling control of the subject vehicle.

8. The method according to claim 7, wherein
    in the determining the specific position, determining, as the parking position which is the specific position satisfying the predetermined condition, the specific position where the size of the blind spot area is at or below an acceptable value.

9. The method according to claim 7 further comprising:
    estimating an approaching direction from which another vehicle traveling on a road approaches the subject vehicle, the subject vehicle entering the road when the subject vehicle leaves the parking space, wherein in the calculating the size of the blind spot area, calculating a size of an approaching direction area which is a part of the blind spot area located on an approaching direction side, and in the determining the specific position, determining, as the parking position which is the specific position satisfying the predetermined condition, the specific position where the size of the approaching direction area is at or below an acceptable value.

10. The method according to claim 7, wherein in the determining the specific position, determining again the parking position satisfying the predetermined condition when it is detected that another vehicle parked around the parking space has moved after the subject vehicle is parked, and in the assisting parking, assisting moving the subject vehicle to the re-determined parking position.

11. The method according to claim 7, wherein in the calculating the size of the blind spot area, calculating the blind spot area based on information about another vehicle which is predicted to be parked around the parking space before a scheduled departure time from the parking space of the subject vehicle.

12. The method according to claim 7, wherein in the calculating the size of the blind spot area, calculating the blind spot area based on information about a recognizable area created by a reflector object which makes an environment around the subject vehicle to be recognizable by reflection of the reflector object.

13. A computer program product stored on at least one non-transitory computer readable medium and comprising instructions configured to, when executed by at least one processor, cause the at least one processor to:

calculate a size of a blind spot area of a subject vehicle created when the subject vehicle is parked at a specific position in a parking space scheduled for the subject vehicle;

determine, as a parking position, the specific position where a predetermined condition related to the size of the blind spot area is satisfied; and assist parking of the subject vehicle at the determined parking position, wherein the assist of parking of the subject vehicle includes a traveling control of the subject vehicle.

* * * * *